UNITED STATES PATENT OFFICE.

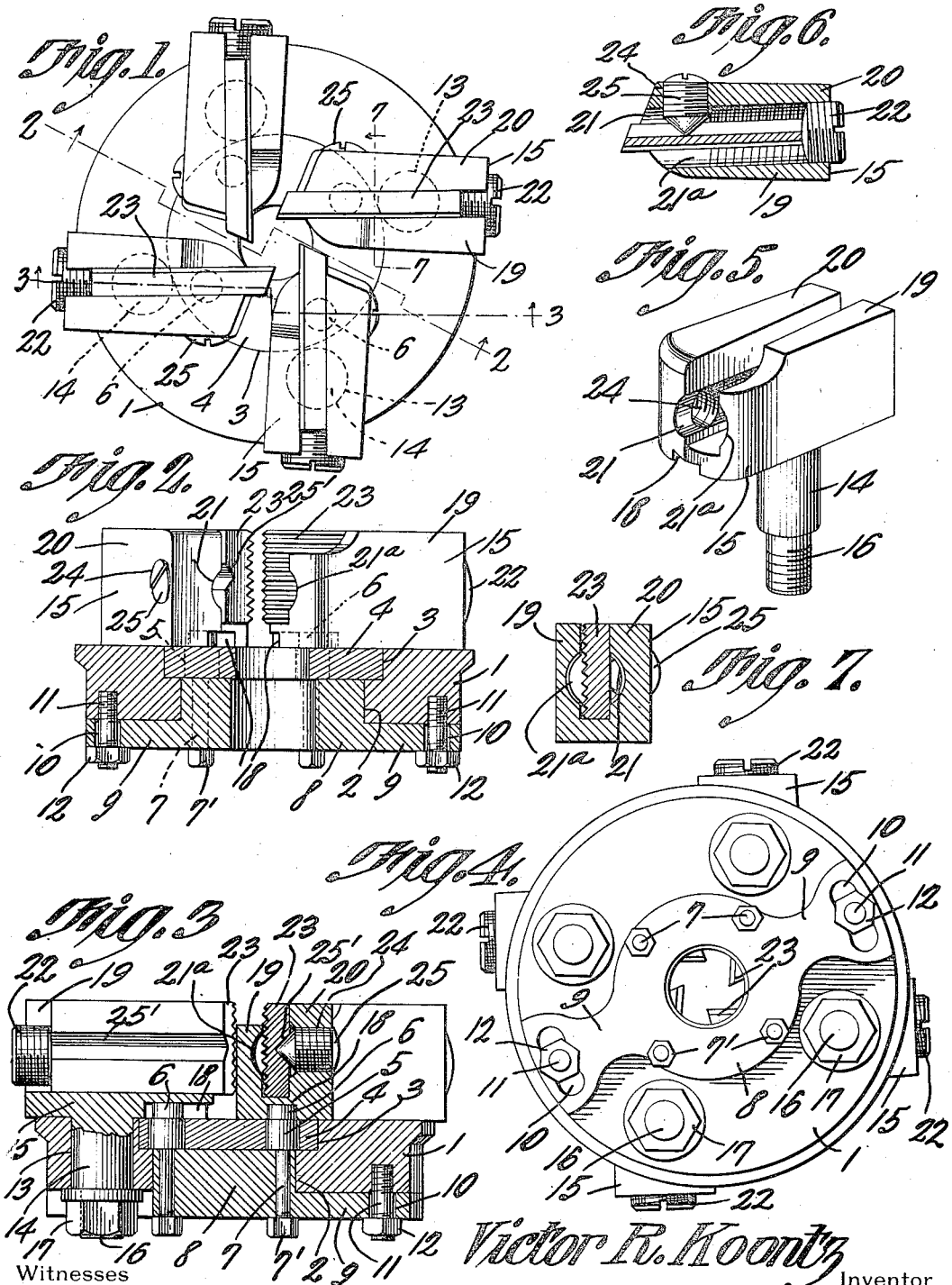

VICTOR R. KOONTZ, OF WAYNESBORO, PENNSYLVANIA.

CUTTER-HEAD.

1,149,452.  Specification of Letters Patent.  Patented Aug. 10, 1915.

Application filed June 23, 1913. Serial No. 775,386.

*To all whom it may concern:*

Be it known that I, VICTOR R. KOONTZ, a citizen of the United States, residing at Waynesboro, in the county of Franklin and State of Pennsylvania, have invented a new and useful Cutter-Head, (Case B,) of which the following is a specification.

The present invention relates to improvements in cutter heads, one object of the invention being the provision of a tool holder for cutter heads, which are readily detached from the main carrying member and in which the structure is simplified by the dispensing with the usual grooves for the guidance of the tool holders when moved into and out of work engaging position.

With the foregoing and other objects in view which will appear as the description proceeds, the invention resides in the combination and arrangement of parts and in the details of construction hereinafter described and claimed it being understood that changes in the precise embodiment of the invention herein disclosed can be made without in the scope of what is claimed without departing from the spirit of the invention.

In the drawings—Figure 1 is a facial view of the complete cutter head taken from the cutter or die end thereof. Fig. 2 is a section taken on line 2—2 of Fig. 1. Fig. 3 is a section taken on line 3—3 of Fig. 1. Fig. 4 is a rear view of the complete cutter head showing the means for moving the die or cutter holders into and out of work engaging position. Fig. 5 is a perspective view of one of the tool or die holders. Fig. 6 is a detail longitudinal sectional view of one of the tool or die holders. Fig. 7 is a transverse section therethrough.

Referring to the drawings, the numeral 1 designates the main carrying member of the present device, which is made in the form of a ring with the double diametered portions at 2 and 3 respectively. The enlarged diametered portion 3 has seated therein for oscillation, a ring or disk 4, which as clearly shown is provided with and carries the fixed cylindrical member 5 with the reduced studs or pin 6 projecting beyond the outer face of the member 4 while from the opposite end is projected the bolt or pin 7 for the reception of the nut 7' so that the operating member 8 for the disk or member 4, as will presently appear, may be properly connected to the member 4. The operating member 8 is provided, as shown in Fig. 4, with the oppositely extending arms 9 provided with the arcuate slots 10. In order to limit the movement of the arms 9 and consequently the member 4, the threaded pins 11 are projected through the arcuate slots 10 and the nuts 12 as clearly shown are placed thereupon.

In the member 4, in the present instance, are formed four cylindrical bores 13 for the reception of the cylindrical portions 14 of the tool holder carrying pin, the tool holder 15 being preferably formed integral therewith, or having the pin 14 secured fixedly thereto, the purpose of which will presently appear. The pin 14 with its tool or die holder 15 is properly positioned relatively to the member 1 by means of the nut 17 upon the threaded end 16, which is projected beyond the other face of the member 1 of the cutter or die head.

As clearly shown, the tool or die holder 15 is provided at one end with the recessed portion 18, the same fitting over the pin 5, so that with the pin 14 the center for the swinging movement of the holder 15, the disk 14 when oscillated, will through the pin 5 and the slot 18 impart a swinging movement to the tool holder, so as to move the tool or die 23 to and from work engaging position.

The tool or die holder 12 is preferably constructed with the two upstanding walls 19 and 20, which are spaced for the reception of the cutter or die 23, which is of a type that, as worn, is readily ground to be resharpened and which can be used as long as there is sufficient length to be gripped within the holder. Formed longitudinally of the walls 19 and 20 upon the opposite faces thereof and intermediate of the upper and lower edges are the concaved faces 21—21ª which are threaded the greater portion of their length for the reception of the abutting screw 22, which is disposed to abut the rear end of the cutter 23 to hold the same against longitudinal movement. By this means it will be seen that the screw 22 may be rotated so as to fit within the threaded portion at any point so as to hold the work engaging end of the tool or die 23 properly within the holder. In order to lock the tool against lateral movement due to the engagement thereof with the work, the threaded bore 24 is disposed within the wall 20 adjacent the inner end of the tool holder for the reception of the screw 25, which as shown in Fig. 3 is engaged in a conical recess 25' formed in the adjacent face of the tool or die 23 and thus assist in locking the tool or die against any movement whatsoever within the holder. The adjusting screw 22 also acts as a means for adjusting the cutter or die longitudinally within the holder when the screw 25 has been released to permit of such movement, after which time the screw 25 is actuated to engage and lock the tool or die 23 properly within the holder.

The arms 9 may be moved by any well known means to move the tool holder so that the cutting ends of the tools or dies will be moved into and out of work engaging position, or if so desired the arms 9 may be held stationary and the member 1 oscillated to perform the same function.

What is claimed is:

A cutter holder, including a body portion having a longitudinal groove therethrough, an integral pivoting pin disposed at right angles to the underside of and near the rear end of the holder, said body portion being provided with an inclined longitudinally disposed groove the full length of the upper face thereof, a portion of the opposed walls of the groove being screw threaded, a cutter provided with a longitudinal groove in one side thereof and parallel cutter forming ribs upon the opposite side, a screw insertible within the threaded portion of the main groove of the holder for engagement with the rear end of the cutter to adjust the cutter longitudinally of the holder, and a screw fitting in one wall at the forward end of the holder and at right angles to the cutter, the inner end of said screw being tapered to fit within the longitudinal groove of the cutter to lock the same against the opposite wall of the groove.

In testimony that I claim the foregoing as my own, I have hereto affixed my signature in the presence of two witnesses.

VICTOR R. KOONTZ.

Witnesses:
   JOSEPHINE ROLLMAN,
   WATSON R. DAWSON.